(12) United States Patent
Corbett

(10) Patent No.: US 9,436,786 B1
(45) Date of Patent: Sep. 6, 2016

(54) METHOD AND CIRCUITS FOR SUPERCLOCKING

(71) Applicant: Xilinx, Inc., San Jose, CA (US)

(72) Inventor: John D. Corbett, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/817,521

(22) Filed: Aug. 4, 2015

Related U.S. Application Data

(62) Division of application No. 14/179,321, filed on Feb. 12, 2014.

(51) Int. Cl.
*G06F 17/50* (2006.01)

(52) U.S. Cl.
CPC ....... *G06F 17/5045* (2013.01); *G06F 17/5054* (2013.01); *G06F 17/5077* (2013.01)

(58) Field of Classification Search
CPC ............ G06F 17/5045; G06F 17/505; G06F 17/5054; G06F 17/5068; G06F 17/5072; G06F 17/5077

See application file for complete search history.

(56) References Cited

U.S. PATENT DOCUMENTS

| | | | | |
|---|---|---|---|---|
| 6,397,169 B1 * | 5/2002 | Shenoy | ............... | G06F 17/5072 703/14 |
| 6,711,447 B1 * | 3/2004 | Saeed | ................... | G06F 1/3203 700/82 |
| 6,804,632 B2 * | 10/2004 | Orenstien | ............... | G06F 1/206 702/182 |
| 7,451,333 B2 * | 11/2008 | Naveh | ................... | G06F 1/3203 713/323 |
| 7,457,969 B2 * | 11/2008 | Slaight | ............... | G05B 23/0235 702/182 |
| 7,467,325 B2 * | 12/2008 | Eisen | ................... | G06F 9/30043 711/E12.021 |
| 7,502,948 B2 | 3/2009 | Rotem et al. | | |
| 7,526,661 B2 * | 4/2009 | Nakajima | ............... | G06F 1/3203 713/300 |
| 7,650,518 B2 * | 1/2010 | Allarey | ................... | G06F 1/206 713/300 |
| 7,797,610 B1 * | 9/2010 | Simkins | ................... | G11C 8/16 714/763 |
| 7,898,244 B2 * | 3/2011 | Taylor | ................... | G01B 5/0014 324/207.15 |
| 8,005,881 B1 * | 8/2011 | Szanto | ................... | G06T 5/002 382/262 |
| 8,037,893 B2 * | 10/2011 | Aguilar, Jr. | ............... | G06F 8/45 137/12 |
| 8,190,863 B2 * | 5/2012 | Fossum | ................. | G06F 1/3203 711/154 |
| 8,304,698 B1 * | 11/2012 | Tischler | ................. | G06F 1/206 219/481 |
| 8,402,290 B2 * | 3/2013 | Finkelstein | ............. | G06F 1/206 713/320 |
| 8,650,424 B2 * | 2/2014 | Rotem | ..................... | G06F 1/206 713/300 |
| 8,707,060 B2 * | 4/2014 | Rotem | ..................... | G06F 1/206 713/300 |
| 2007/0208965 A1 * | 9/2007 | Ma | ........................ | G06F 1/3203 713/600 |
| 2013/0015904 A1 * | 1/2013 | Priel | .................... | G06F 1/3203 327/419 |

(Continued)

OTHER PUBLICATIONS

Specification and drawings for U.S. Appl. No. 14/179,321, filed Feb. 12, 2014, Corbett.

(Continued)

*Primary Examiner* — Jason M Crawford
*Assistant Examiner* — Kurtis R Bahr
(74) *Attorney, Agent, or Firm* — LeRoy D. Maunu

(57) ABSTRACT

Methods and circuits for superclocked operation of a plurality of functionally-equivalent logic circuits are disclosed. One of the plurality of functionally-equivalent logic circuits is selected according to a selection algorithm. In response to selecting one of the plurality of functionally-equivalent logic circuits, superclocked operation of the selected one of the plurality of functionally-equivalent logic circuits is enabled. Superclocked operation of other ones of the plurality of functionally-equivalent logic circuits is disabled. The selected one of the plurality of functionally-equivalent logic circuits is used to process a portion of the input data set at the superclocked clock frequency.

20 Claims, 8 Drawing Sheets

(56) References Cited

U.S. PATENT DOCUMENTS

| | | | | |
|---|---|---|---|---|
| 2013/0254485 A1* | 9/2013 | Kannan | ............... | G06F 12/0862 711/122 |
| 2014/0101459 A1* | 4/2014 | Debout | ................ | G06F 21/606 713/190 |
| 2014/0108849 A1* | 4/2014 | Allarey | ................... | G06F 1/206 713/501 |
| 2015/0046721 A1* | 2/2015 | Drake | ....................... | G06F 1/08 713/300 |

OTHER PUBLICATIONS

Wikipedia, Intel Turbo Boost, Jan. 22, 2014, Web Sep. 11, 2013, Wikipedia: The Free Encyclopedia, Wikimedia Foundation, Inc., <http://en.wikipedia.org/wiki/Intel_Turbo_Boost#History>.

Intel Corp., Intel Turbo Boost Technology—On-Demand Processor Performance, Web Jan. 30, 2014, Intel Corporation, Santa Clara, California, USA, <http://www.intel.com/content/www/us/en/architecture-and-technology/turbo-boost/turbo-boost-technology.html>.

\* cited by examiner

METHOD AND CIRCUITS FOR SUPERCLOCKING

CROSS-REFERENCE TO RELATED APPLICATION

This application is a divisional of U.S. patent application Ser. No. 14/179,321 filed on Feb. 12, 2014, which is hereby incorporated herein by reference.

TECHNICAL FIELD

The disclosure generally relates to the clocking of electronic circuits.

BACKGROUND

The operating temperature of electronic circuits is strongly correlated with the clock frequency at which the circuits are operated. Electronic circuits are susceptible to damage if operated above a particular threshold temperature. Electronic circuits may be tested by manufacturers to determine a maximum clock frequency at which the circuits may operate continuously for an expected lifetime without damage. Even for different instances of the same circuit, the maximum clock frequency may vary from circuit to circuit due to slight variations in the manufacturing process.

Circuits are often rated by manufacturers to indicate a clock frequency at which the circuits are guaranteed to operate continuously for their expected lifetimes. The maximum frequency at which a circuit may be operated continuously without damage may be greater than the rated frequency. Accordingly, in some situations, a circuit may be operated at a clock frequency above the rated clock frequency to achieve faster processing. The process of operating a circuit at a frequency above its rated clock frequency is referred to as overclocking.

Overclocked circuits are operated at a clock frequency between a rated clock frequency and a maximum clock frequency that will not damage the circuits during continuous operation. For instance, in one method of overclocking, the temperature of a circuit is monitored and the clock frequency is increased until the temperature of the circuit reaches a maximum threshold temperature. As a result, the circuit is operated at a clock frequency that is closer to the true maximum clock frequency of the circuit that will not result in damage to the circuit.

SUMMARY

Methods and circuits are disclosed for operating circuits at clock frequencies that exceed a maximum clock frequency at which the circuits may be operated continuously for a threshold period of time without damaging the circuits. For ease of reference, the term superclocked clock frequency may be used to refer to a clock frequency that is greater than the maximum clock frequency of a circuit. As the superclocked clock frequency is greater than the maximum clock frequency, the circuit will become damaged if continuously operated at a superclocked clock frequency for the threshold period of time. The term superclocked operation may be used to refer to operation of a circuit at the superclocked clock frequency.

A circuit for superclocking is disclosed. The circuit includes an input node configured to receive an input data stream and a plurality of functionally-equivalent logic circuits. Each of the functionally-equivalent logic circuits is configured to process the input data stream at a superclocked clock frequency when enabled. A control circuit is coupled to the plurality of functionally-equivalent logic circuits. The control circuit is configured to select one of the plurality of functionally-equivalent logic circuits at a time, according to a selection algorithm. In response to selecting one of the plurality of functionally-equivalent logic circuits, the control circuit enables superclocked operation of the selected logic circuit and disables superclocked operation of other ones of the plurality of functionally-equivalent logic circuits.

A method for processing an input data set at a superclocked clock frequency is also disclosed. A plurality of functionally-equivalent logic circuits are selected, one at a time, according to a selection algorithm. In response to selecting one of the plurality of functionally-equivalent logic circuits, superclocked operation of the selected one of the plurality of functionally-equivalent logic circuits is enabled. Superclocked operation of other ones of the plurality of functionally-equivalent logic circuits is disabled. The selected one of the plurality of functionally-equivalent logic circuits is used to process a portion of an input data set at the superclocked clock frequency.

A method of generating a netlist circuit design model is also disclosed. Using one or more programmed processors, a circuit design is added to a netlist. For at least one module instance of the circuit design, one or more duplicate module instances of the corresponding module are added to the netlist. The at least one module instance and the duplicate module instances form a set of module instances. The set of module instances are configured to operate at a superclocked clock frequency when enabled. A control circuit is added to the netlist. The control circuit is configured to select one of the set of module instances at a time, according to a selection algorithm. In response to selecting one of the plurality of functionally-equivalent logic circuits, the control circuit enables superclocked operation of the selected logic circuit and disables superclocked operation of other ones of the plurality of functionally-equivalent logic circuits.

Other features will be recognized from consideration of the Detailed Description and Claims, which follow.

BRIEF DESCRIPTION OF THE DRAWINGS

Various aspects and features of the method and circuits will become apparent upon review of the following detailed description and upon reference to the drawings, in which.

DETAILED DESCRIPTION

Methods and circuits are disclosed for operating circuits at superclocked clock frequencies without resulting in damage to the circuits. A single circuit cannot be continuously operated at a superclocked clock frequency for an extended duration of time without resulting in damage to the circuit. The disclosed circuitry allows for processing operations to be continuously performed at a superclocked clock frequency by distributing the processing across multiple functionally-equivalent logic circuits. For instance, a first logic circuit may operate at the superclocked clock frequency until the temperature of the logic circuit rises to a threshold temperature, beyond which the logic circuit may become damaged. After reaching the threshold temperature, the superclocked operation of the first logic circuit is disabled and allowed to cool while a second functionally-equivalent logic circuit is enabled and operated at the superclocked clock frequency.

The processing of the functionally equivalent logic circuit is application dependent. The instances of the logic circuit are functionally equivalent in that each instance will produce the same output data if the same input data are input.

In one implementation, a circuit includes a plurality of functionally-equivalent logic circuits configured to process an input data stream at a superclocked clock frequency when enabled. A control circuit selects one of the functionally-equivalent logic circuits at a time, according to a selection algorithm. In response to selecting one of the plurality of functionally-equivalent logic circuits, the control circuit enables superclocked operation of the selected logic circuit and disables superclocked operation of the other functionally-equivalent logic circuits. The selection of one of the functionally-equivalent logic circuits at a time for superclocked operation allows for continuous processing at a superclocked clock frequency without damaging the individual logic circuits.

Figure 1:
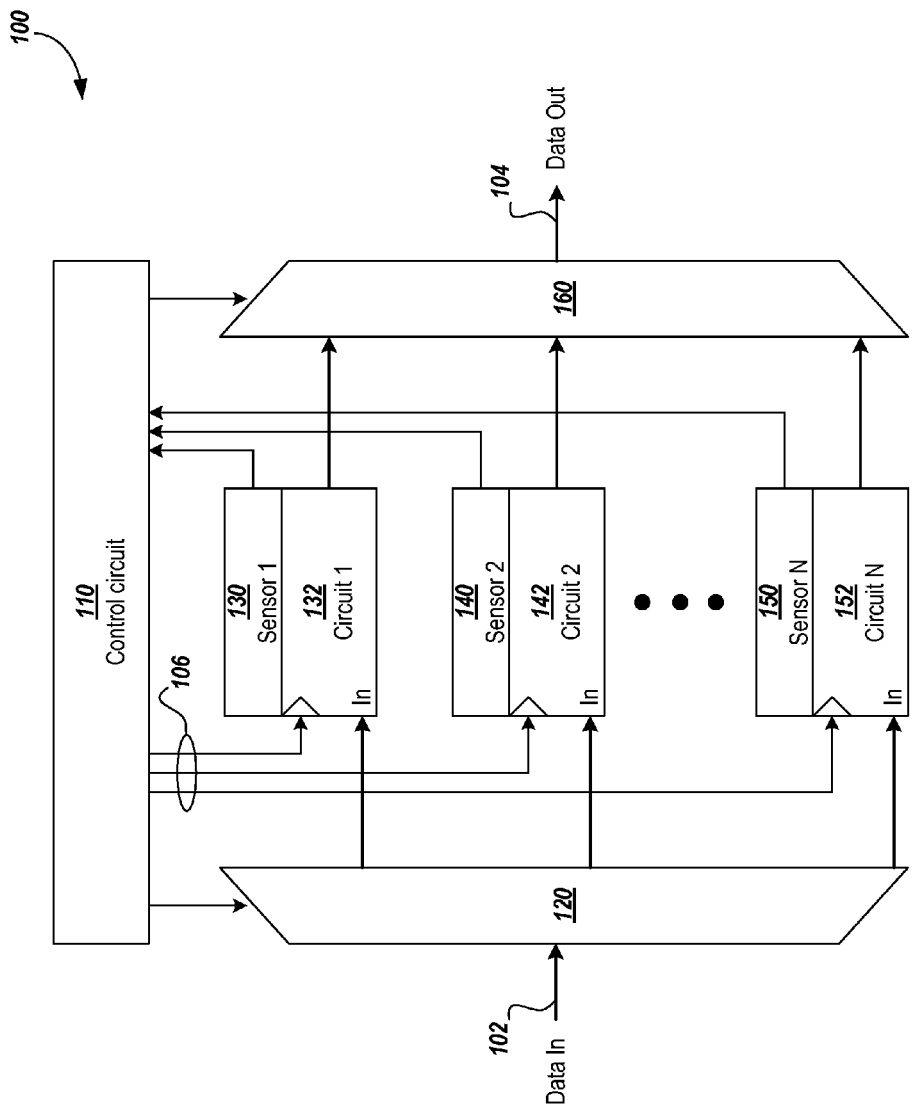
FIG. 1 shows a circuit for superclocking a plurality of functionally-equivalent logic circuits.

Turning now to the figures, FIG. 1 shows a circuit for superclocking of a plurality of functionally-equivalent logic circuits. The circuit 100 includes N functionally-equivalent logic circuits 132, 142, and 152. The circuit 100 also includes a control circuit 110 configured to select one of the plurality of functionally-equivalent logic circuits 132, 142, and 152 at a time, according to a selection algorithm. In response to selecting one of the plurality of functionally-equivalent logic circuits, the control circuit 110 enables superclocked operation of the selected logic circuit and disables superclocked operation of other ones of the plurality of functionally-equivalent logic circuits. In this example, superclocked operation may be enabled or disabled, for example, by adjusting the frequencies of clock signals (106) provided to each of the functionally-equivalent logic circuits 132, 142, and 152. For instance, when enabled, the clock signal provided to a logic circuit by the control circuit 110 is set to have a superclocked clock frequency. When disabled, the clock signal provided to the logic circuit by the control circuit 110 is set to have a clock frequency that is less than the maximum clock frequency for which the circuit may be operated continuously for an expected period without damage. In some implementations, the clock signal provided to a disabled circuit may be less than a rated clock frequency of the circuit or may be idle. In some implementations, superclocked operation of one of the functionally-equivalent logic circuits may be disabled by powering down the circuit or stopping the clock to the circuit.

The control circuit 110 may utilize any of various selection algorithms to select among the plurality of functionally-equivalent logic circuits for superclocked operation. In some implementations, the selection algorithm may select logic circuits so that each circuit is selected the same number of times (e.g., a round-robin selection algorithm). In some implementations, the selection algorithm may select logic circuits for superclocked operation based on operating conditions of the logic circuits (e.g., temperature, toggle rate, data throughput, and error rate). The selection algorithm may select logic circuits for superclocked operation based on placement of the logic circuits in the overall circuit. For example, the selection algorithm may select logic circuits for superclocked operation so that heat generated by the logic circuits is more evenly distributed over the entire circuit.

In some implementations, the circuit 100 also includes N sensors 130, 140, and 150, as shown in FIG. 1. Each of the sensors 130, 140, and 150 is configured to measure one or more operating conditions of a respective one of the functionally-equivalent logic circuits. The operating conditions may include, for example, temperature of the logic circuit, toggle rate of the logic circuit, or error rate of the logic circuit. A sensor may directly measure of an operating condition such as a temperature of a circuit. In some other implementations, a sensor may measure a characteristic correlated with one of the operating conditions. For example, an oscillator may be used to provide an indication of a temperature of a circuit because the frequency at which the oscillator operates varies as a function of temperature. The control circuit may use the measured operating conditions to determine when a new one of the functionally-equivalent logic circuits should be selected or to determine the order in which the functionally-equivalent logic circuits are selected.

In this example, the circuit 100 further includes a selection circuit including a demultiplexer 120 and a multiplexer 160. The demultiplexer 120 has an input terminal connected to an input node (102) of the circuit 100 and has a plurality of output terminals. Each of the output terminals is respectively connected to an input terminal of a respective one of the plurality of functionally-equivalent logic circuits 132, 142 and 152. The multiplexer 160 has an output terminal connected to the output node (104) and has a plurality of input terminals. Each of the input terminals is respectively connected to an output terminal of a respective one of the plurality of functionally-equivalent logic circuits 132, 142 and 152.

In response to selecting one of the plurality of functionally-equivalent logic circuits 132, 142, and 152, the control circuit 110 controls the demultiplexer 120 to connect the input terminal of the selected one of the plurality of functionally-equivalent logic circuits to the input node and controls the multiplexer 160 to connect the output terminal of the selected one of the plurality of functionally-equivalent logic circuits to the output node.

In some implementations, the demultiplexer 120 and multiplexer 160 may be omitted and input and/or output terminals of the plurality of functionally-equivalent logic circuits 132, 142, and 152 may be directly connected to the input and/or output nodes. When output terminals are connected directly to the output node, non-selected circuits should be disabled in a manner so output signals of the selected one of the functionally-equivalent logic circuits is not adversely affected by the non-selected circuits (e.g., by powering down the non-selected circuits).

Figure 2:
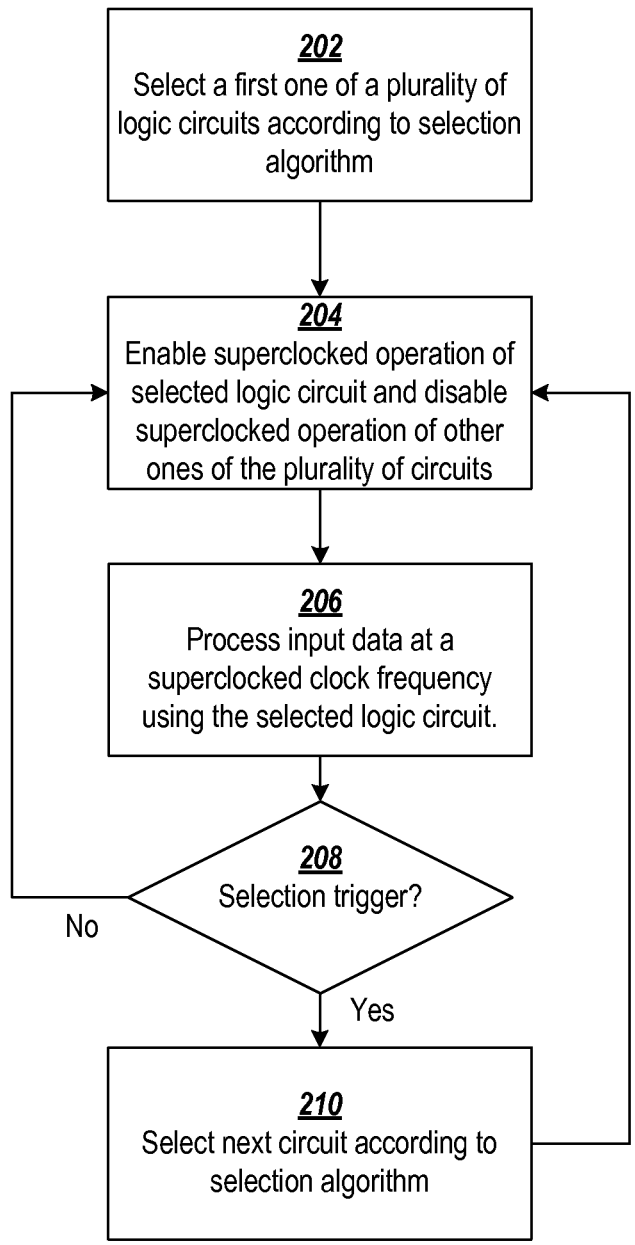
FIG. 2 shows a first method for superclocking a plurality of functionally-equivalent logic circuits.

FIG. 2 shows a first method for superclocking of a plurality of functionally-equivalent logic circuits. A first one of a plurality of logic circuits is selected according to a selection algorithm at block 202. At block 204, superclocked operation of the selected logic circuit is enabled and superclocked operation of other ones of the plurality of logic circuits is disabled. At block 206, input data is processed at a superclocked clock frequency using the selected one of the plurality of logic circuits. The superclocked operation of the selected logic circuit continues until a selection trigger is encountered at decision block 208. Selection triggers may include, for example, a temperature of the selected logic circuit reaching a threshold temperature or expiration of a timer.

Once a selection trigger is encountered, another one of a plurality of logic circuits is selected according to the selection algorithm at block 210. At block 204, superclocked operation of the new selected logic circuit is enabled and superclocked operation of the other logic circuits, including the previously selected logic circuit, is disabled. The selection of a new one of the logic circuits for superclocked operation at every selection trigger allows for continuous processing at a superclocked clock frequency without damaging the logic circuits.

Figure 3:
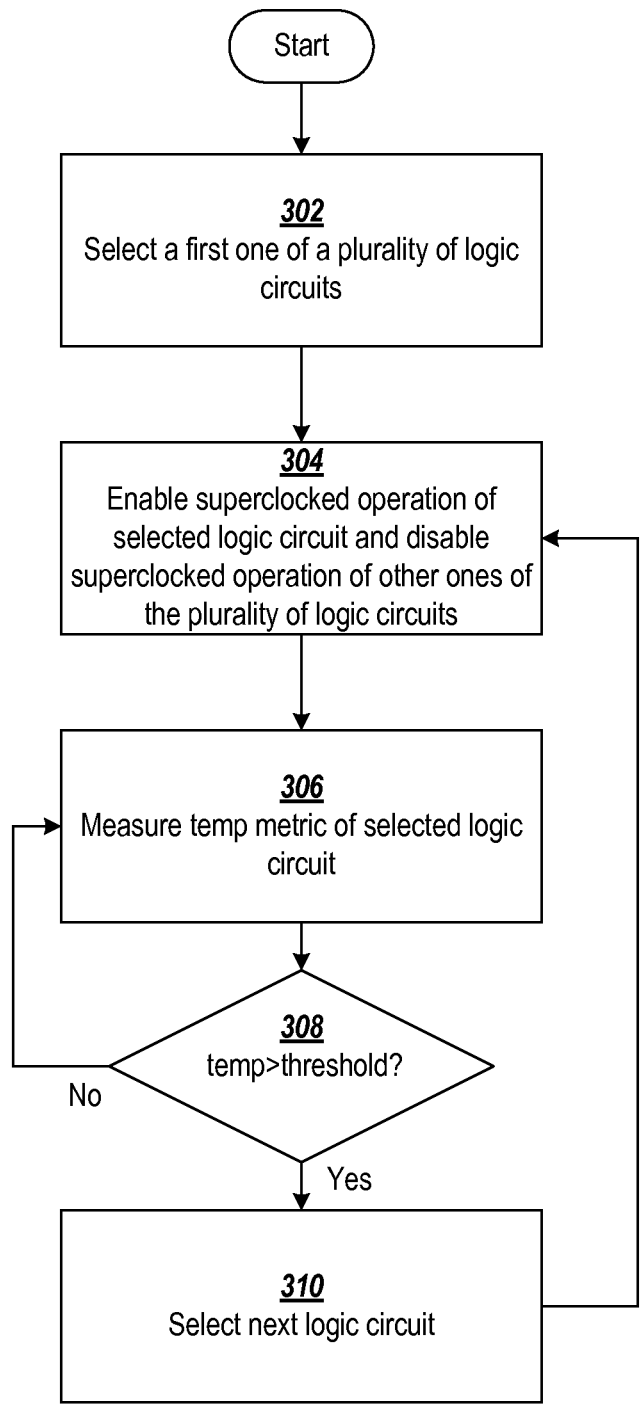
FIG. 3 shows a second method for superclocking a plurality of functionally-equivalent logic circuits.

FIG. 3 shows a second method for superclocking of a plurality of functionally-equivalent logic circuits. A first one of a plurality of logic circuits is selected according to a selection algorithm at block 302. At block 304, superclocked operation of the selected logic circuit is enabled and superclocked operation of other ones of the plurality of logic circuits is disabled. In this example, a new logic circuit is selected at blocks 306, 308, and 310, in response to the temperature of the selected circuit exceeding a threshold temperature. A temperature metric indicative of temperature (e.g., temperature, toggle rate, processing speed, and error rate) is measured at decision block 308. If the measured temperature metric is indicative of temperature exceeding a threshold temperature at decision block 308, the next logic circuit is selected at block 310. At block 304, superclocked operation of the new selected logic circuit is enabled, superclocked operation of the other logic circuits is disabled, and the process is repeated.

Figure 4:
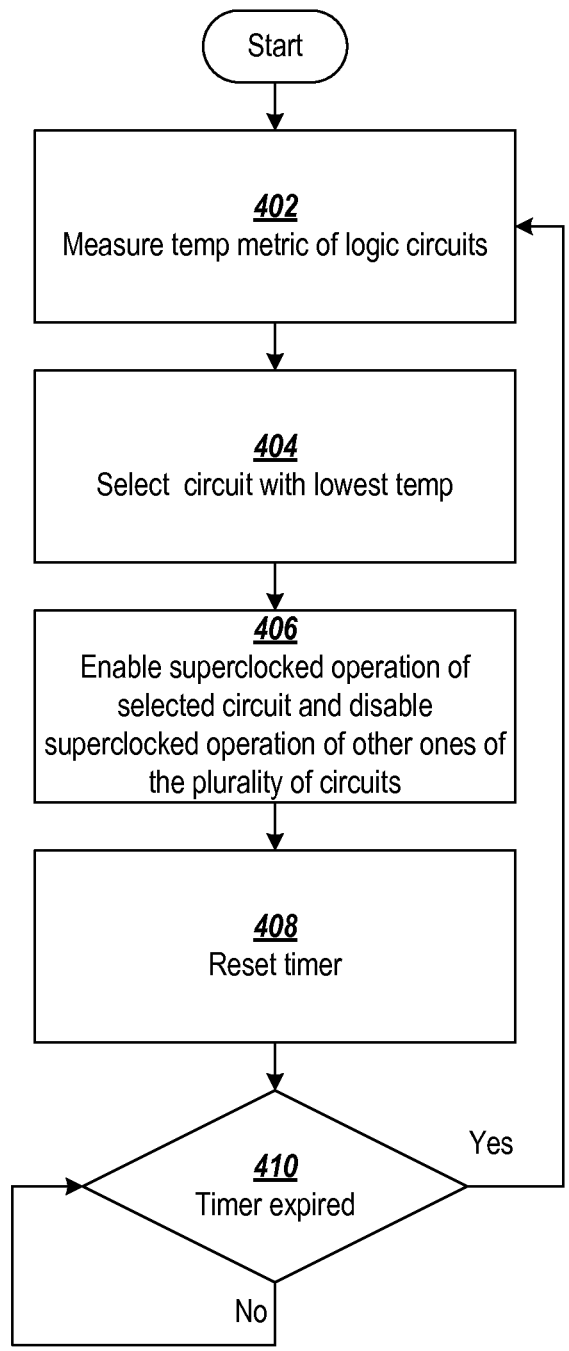
FIG. 4 shows a third method for superclocking a plurality of functionally-equivalent logic circuits.

FIG. 4 shows a third method for superclocking of a plurality of functionally-equivalent logic circuits. In this example, the order in which logic circuits are selected for superclocking is based on the temperature of the logic circuits. A temperature metric of the logic circuits is measured at block 402. The logic circuit with the lowest temperature is selected at block 404. At block 406, superclocked operation of the selected logic circuit is enabled and superclocked operation of other ones of the plurality of logic circuits is disabled. In this example, the selected logic circuit is operated at a superclocked clock frequency for a set period of time, indicated by a timer, before a next logic circuit is selected. When superclocked operation of a selected circuit is enabled at block 406, the timer is reset at block 408. Upon expiration of the timer, decision block 410 directs the process to again measure the temperature metric at block 402 and select another logic circuit for superclocked operation at block 404.

Figure 5:
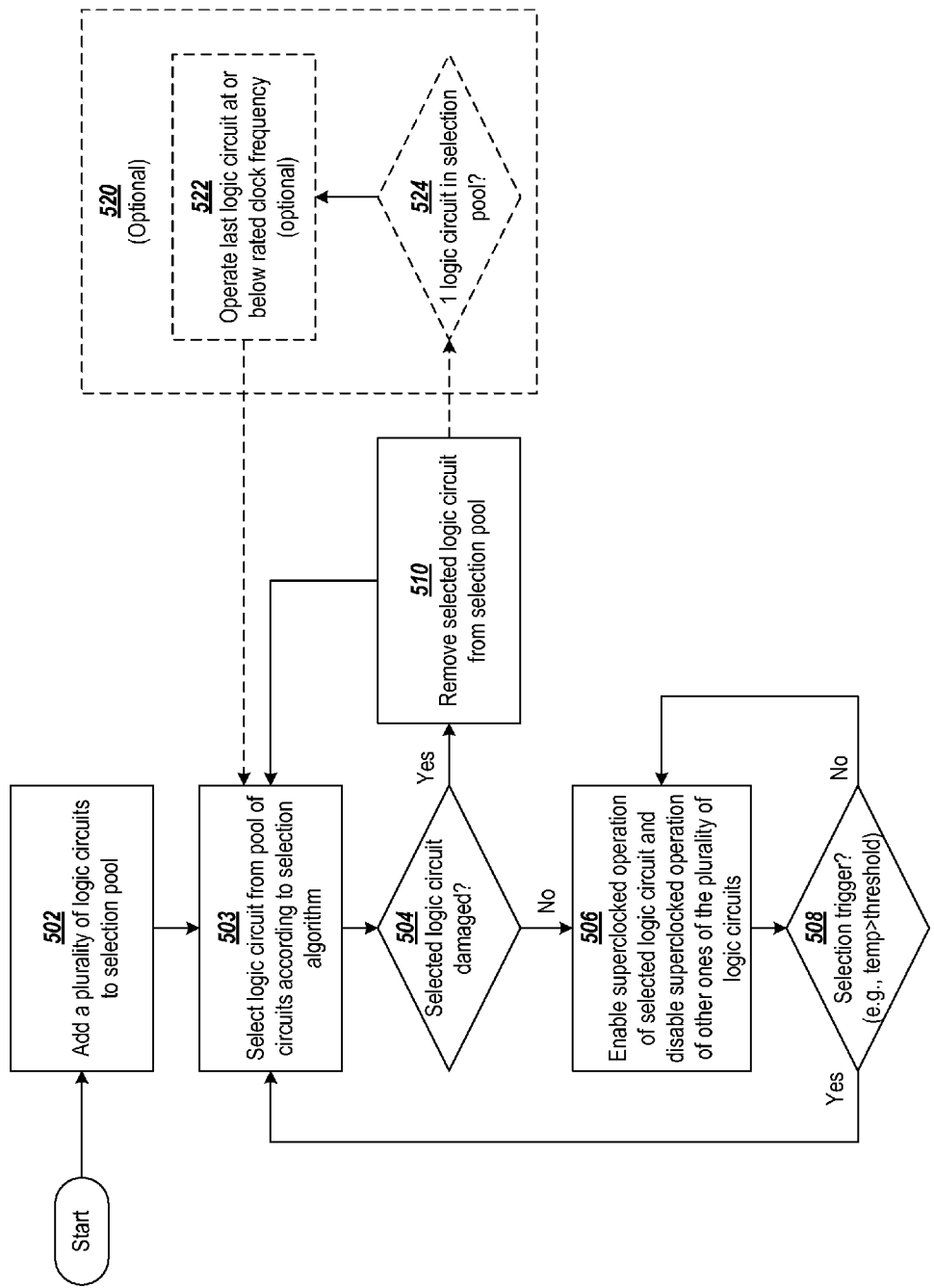
FIG. 5 shows a fourth method for superclocking a plurality of functionally-equivalent logic circuits.

FIG. 5 shows a fourth method for superclocking of a plurality of functionally-equivalent logic circuits. In this example, the logic circuits are monitored and removed from a pool of logic circuits eligible for selection upon becoming damaged. A plurality of functionally-equivalent logic circuits is added to a selection pool at block 502. A logic circuit is selected according to a selection algorithm at block 503. If the selected logic circuit is not damaged at decision block 504, superclocked operation of the selected logic circuit is enabled at block 506 and superclocked operation of other ones of the plurality of logic circuits is disabled. In this example, a new logic circuit is selected in response to encountering a selection trigger at decision block 508. Once a selection trigger is encountered, another one of a plurality of logic circuits is selected according to the selection algorithm at block 503.

In this example, if a selected logic circuit is damaged, decision block 504 directs the process to remove the selected logic circuit from the selection pool at block 510. After removing the damaged circuit from the selection pool, another circuit is selected from the selection pool at block 503 and superclocked operation of the selected circuit is enabled at block 506. In some implementations, process 520 may be performed when only one logic circuit is remaining in the pool. In process 520, decision block 524 directs the process to operate the last logic circuit at a lower clock frequency at block 522 to extend the remaining lifetime of the logic circuit.

Figure 6:
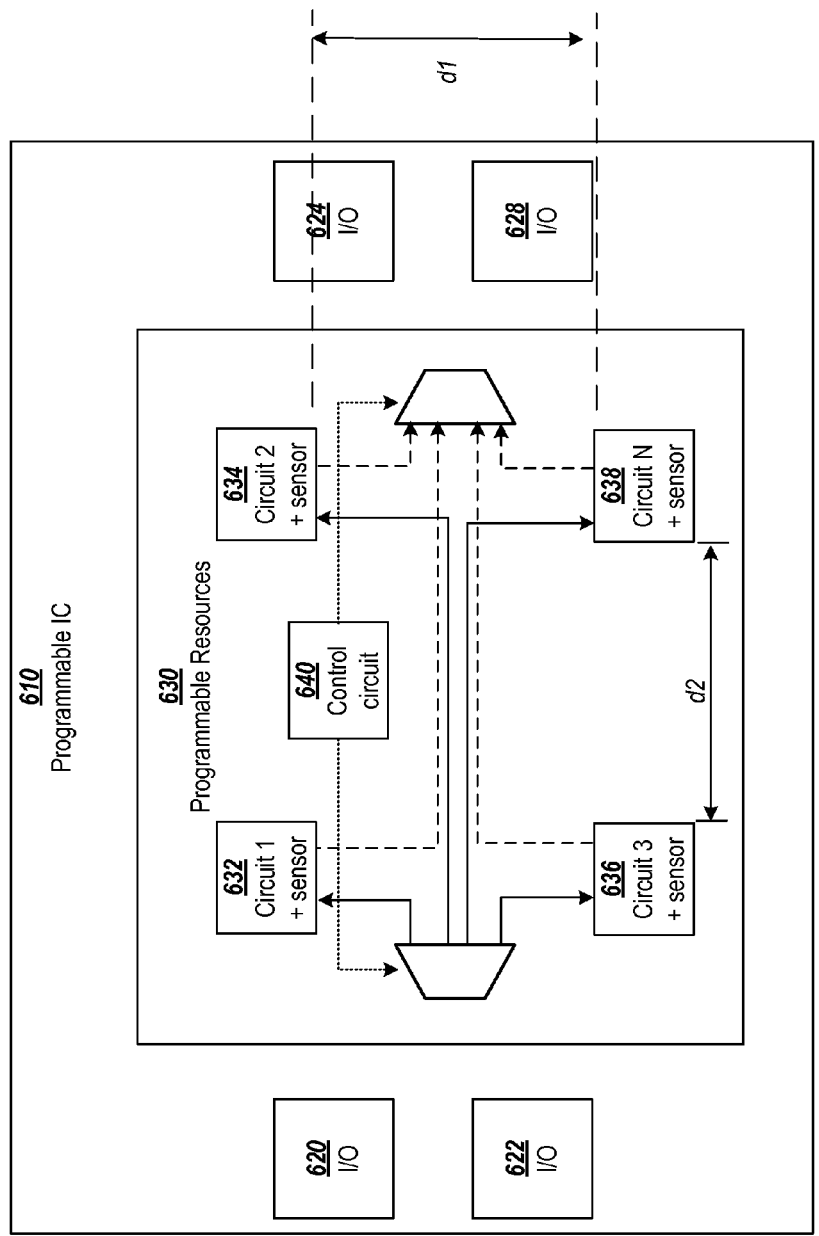
FIG. 6 shows a programmable IC configured to superclock a circuit design module using multiple instances of the circuit design module.

FIG. 6 shows a programmable integrated circuit (IC) configured to superclock a circuit design module by implementing multiple instances (module instances) of the circuit design module. The programmable IC 610 includes programmable resources 630 and a set of input/output (I/O) circuits 620, 622, 624 and 628 implemented on a single IC die. The programmable resources 630 may be configured by a user to implement the user's logic. The set of input/output (I/O) circuits 620, 622, 624 and 628 may be used to input data to and output data from circuits implemented by the programmable resources.

In this example, the programmable resources 630 are configured to implement a plurality of functionally equivalent logic circuits 632, 634, 636, and 638 and a control circuit 640. Similar to the control circuit 110 described with reference to FIG. 1, the control circuit 640 is configured to select the plurality of functionally-equivalent logic circuits 632, 634, 636, and 638 one at a time according to a selection algorithm. In response to selecting one of the plurality of functionally-equivalent logic circuits, the control circuit 640 enables superclocked operation of the selected logic circuit and disables superclocked operation of other ones of the plurality of functionally-equivalent logic circuits. The plurality of functionally-equivalent logic circuits 632, 634, 636, and 638 may be placed at locations that are spaced apart in the programmable resources 630 (e.g., by distances d1 and d2) to optimize dissipation of heat generated by the plurality of functionally-equivalent logic circuits 632, 634, 636 and 638.

Figure 7:
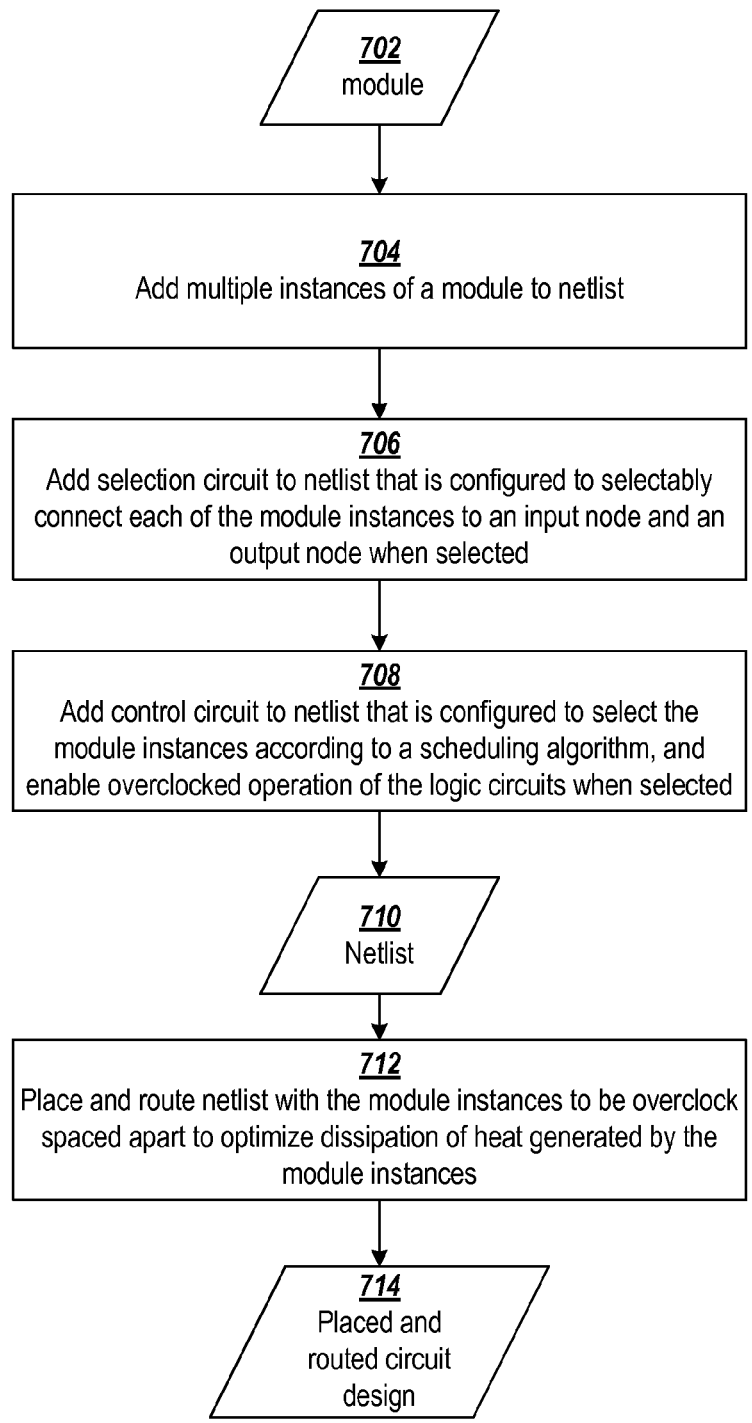
FIG. 7 shows a method for generating circuits configured to superclock a circuit design module using multiple redundant module instances.

FIG. 7 shows a method for generating circuits configured to superclock a circuit design module using multiple redundant module instances. Multiple instances of a module 702 are added to a netlist 710 at block 704. A selection circuit is added to the netlist 710 at block 706. The selection circuit is configured to selectably connect each of the module instances to an input node and an output node when selected. A control circuit is added to the netlist 710 at block 708. The control circuit is configured to select the module instances according to a selection algorithm and enable overclocked operation of the logic circuits when selected.

At block 712, the netlist 710 is placed and routed for implementation on a target programmable IC to produce a placed and routed circuit design 714. The placing and routing places the module instances at locations on the target programmable IC so the module instances are spaced apart to optimize dissipation of the heat generated by the module instances. Depending on timing and routing requirements, the optimal placement of the module instances for dissipation of the heat may separate the module instances by a distance less than the maximal possible distance at which module instances may be separated on the target programmable IC.

Figure 8:
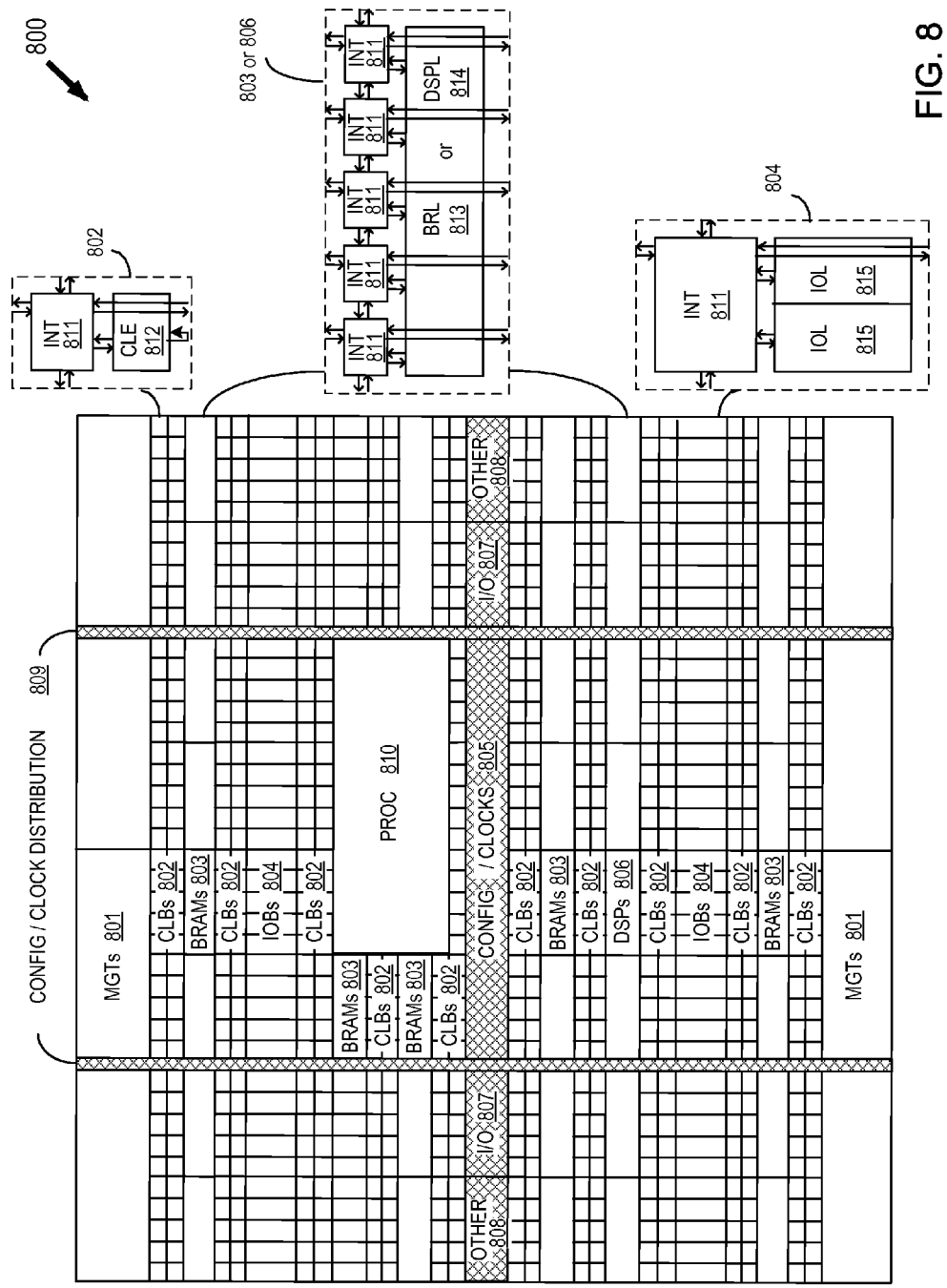
FIG. 8 shows an example field programmable gate array (FPGA) that may be configured to perform superclocking of one or more circuits.

FIG. 8 shows an example field programmable gate array (FPGA) that may be configured to perform superclocking. An FPGA is a type of programmable IC that includes several different types of programmable logic blocks in the array. For example, FIG. 8 illustrates an FPGA architecture (800) that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some FPGAs also include dedicated processor blocks (PROC) 810 and internal and external reconfiguration ports (not shown).

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. In the pictured FPGA, a BRAM tile has the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

In the pictured FPGA, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA, more than one adjacent column of CLBs is typically included wherever the CLBs appear, to facilitate the efficient implementation of user logic.

The circuits and methods are thought to be applicable to a variety of different applications. Other aspects and features will be apparent to those skilled in the art from consideration of the specification. Though aspects and features may in some cases be described in individual figures, it will be appreciated that features from one figure can be combined with features of another figure even though the combination is not explicitly shown or explicitly described as a combination. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
using one or more programmed processors to perform operations including:
adding a circuit design having a first module instance to a netlist, wherein the first module instance is configured to process an input data stream at a superclocked clock frequency when enabled;
adding one or more duplicate module instances that are functionally equivalent to the first module instance to the netlist, wherein the first module instance and the duplicate module instances form a set of module instances; and
adding a control circuit to the netlist, wherein the control circuit is configured and arranged to:
select one of the module instances from the set of module instances at a time, according to a selection algorithm; and
in response to selecting one of the set of module instances, enable superclocked operation of the selected module instance and disable superclocked operation of the other ones of the set of module instances;
placing and routing the netlist for implementation of circuits specified by the netlist using a set of programmable resources on a target programmable integrated circuit (IC) to produce a placed and routed netlist;
wherein the set of programmable resources on the target programmable IC includes a plurality of configurable logic blocks and a plurality of interconnect circuits; and
wherein the placed and routed circuit design specifies a set of the plurality of configurable logic circuits to implement circuits specified by the netlist and specifies a set of the interconnect circuits to implement connections specified by the netlist between the circuits specified by the netlist.

2. The method of claim 1, wherein:
the placing and routing includes placing the set of module instances to maximize a distance between each of the set of module instances on the target programmable IC; and
further comprising, configuring a set of programmable resources on the target programmable IC to implement the placed and routed netlist.

3. The method of claim 1, wherein the control circuit is configured to disable, in response to selecting the one of the set of module instances, operation of the other ones of the set of module instances.

4. The method of claim 1, further comprising:
adding a plurality of sensors to the netlist;
wherein each of the plurality of sensors is configured and arranged to measure an operating condition of a respective one of the set of module instances; and
wherein the control circuit is configured to select one of the set of module instances at a time, based on the operating conditions indicated by the plurality of sensors.

5. The method of claim 4, wherein:
each of the plurality of sensors is a temperature sensor; and
the control circuit is configured to select a new one of the set of module instances in response to one of the plurality of sensors indicating that the selected module instances has a temperature exceeding a threshold.

6. The method of claim 4, wherein:
each of the plurality of sensors is configured to measure a toggle rate of a respective one of the set of module instances; and
the control circuit is configured to select a new one of the set of module instances in response to the toggle rate of the selected module instance being indicative of a temperature exceeding a threshold temperature.

7. The method of claim 4, wherein:
each of the plurality of sensors is an oscillator circuit configured to generate a clock signal having a frequency that correlates to a temperature of the respective one of the set of modules instances; and
the control circuit is configured to select a new one of the set of module instances in response to the sensor for selected module instance generating a clock signal having a frequency indicative of a temperature exceeding a threshold temperature.

8. The method of claim 4, wherein:
each of the plurality of sensors is configured to measure an error rate of the respective one of the set of module instances; and
the control circuit is configured to select a new one of the set of module instances in response to the sensor for selected module instance indicating an error rate indicative of a temperature exceeding a threshold temperature.

9. The method of claim 1, wherein the control circuit is configured to:
select the module instances one at a time from a selection pool; and
in response to determining that the selected module instance is damaged:
remove the selected module instance from the selection pool; and
select a new module instance from the selection pool.

10. A method, comprising:
using one or more programmed processors to perform operations including:
adding a circuit design having a first module instance to a netlist, wherein the first module instance is configured to process an input data stream at a superclocked clock frequency when enabled;
adding one or more duplicate module instances that are functionally equivalent to the first module instance to the netlist, wherein the first module instance and the duplicate module instances form a set of module instances; and
adding a control circuit to the netlist, wherein the control circuit is configured and arranged to:
select one of the module instances from the set of module instances at a time, according to a selection algorithm; and
in response to selecting one of the set of module instances, enable superclocked operation of the selected module instance and disable superclocked operation of the other ones of the set of module instances;
placing and routing the netlist for implementation of circuits specified by the netlist using a set of programmable resources on a target programmable integrated circuit (IC) to produce a placed and routed netlist;
adding a multiplexer and a demultiplexer to the netlist, wherein:
the demultiplexer has an input terminal connected to an input node and a plurality of outputs, each respectively connected to an input terminal of a respective one of the set of module instances;
the multiplexer has an output connected to an output node and a plurality of input terminals, each respectively connected to an output of a respective one of the set of module instances; and
the set of programmable resources on the target programmable IC includes a plurality of configurable logic blocks and a plurality of interconnect circuits;
programming the plurality of configurable logic blocks to implement electronic elements specified the placed and routed netlist; and
programming the plurality of programmable interconnect circuits to form circuit connections specified by the placed and routed netlist and between the electronic elements.

11. The method of claim 10, wherein the control circuit is further configured to:
maintain continuous processing of the input data stream received at the input terminal by selecting, in each successive time period of a plurality of sequential time periods, a different one of the module instances from the set of module instances for processing the input data stream at the superclocked clock frequency, and
in response to selecting one of the set of module instances:
set the demultiplexer to connect the input terminal of the selected one of the set of module instances to the input node; and
set the multiplexer to connect the output of the selected one of the set of module instances to the output node.

12. A programmable integrated circuit (IC), comprising:
an input/output (I/O) circuit configured to receive an input data stream; and
a plurality of programmable resources including a plurality of configurable logic blocks and a plurality of interconnect circuits programmed to implement a circuit arrangement including:
a circuit design including a first module instance configured to process the input data stream at a superclocked clock frequency when enabled;
one or more duplicate module instances that are functionally equivalent to the first module instance, wherein the first module instance and the duplicate module instances form a set of module instances; and
a control circuit coupled to the set of module instances;
wherein the control circuit is configured to maintain continuous processing of the input data stream at the superclocked clock frequency by selecting and enabling one of the module instances at a time;

wherein in response to selecting a module instance, the control circuit is configured to disable other ones of the modules instances, and wherein the plurality of configurable logic blocks are programmed to implement a plurality of circuits of the circuit arrangement and the plurality of interconnect circuits are programmed to form circuit connections between the plurality of circuits of the circuit arrangement.

13. The programmable IC of claim 12, wherein the plurality of programmable resources are further configured to implement:

a demultiplexer having an input terminal connected to an input node and a plurality of outputs, each respectively connected to an input terminal of a respective one of the set of module instances; and a multiplexer have an output connected to an output node and a plurality of input terminals, each respectively connected to an output of a respective one of the set of module instances.

14. The programmable IC of claim 13, wherein the control circuit is further configured to, in response to selecting one of the set of module instances:

set the demultiplexer to connect the input terminal of the selected one of the set of module instances to the input node; and set the multiplexer to connect the output of the selected one of the set of module instances to the output node.

15. The programmable IC of claim 12, wherein the set of module instances are implemented by respective subsets of the plurality of programmable resources that are located to maximize a distance between each of the set of module instances on the programmable IC.

16. The programmable IC of claim 12, wherein the control circuit is configured to disable operation of the other ones of the set of module instances in response to selecting the one of the set of module instances.

17. The programmable IC of claim 12, wherein:

the plurality of programmable resources are further configured to implement a plurality of sensors, each configured to measure an operating condition of a respective one of the set of module instances; and the control circuit is configured to select one of the set of module instances at a time, based on the operating conditions indicated by the plurality of sensors.

18. The programmable IC of claim 17, wherein:

each of the plurality of sensors is a temperature sensor; and the control circuit is configured to select a new one of the set of module instances in response to one of the plurality of sensors indicating that the selected module instances has a temperature exceeding a threshold.

19. The programmable IC of claim 17, wherein:

each of the plurality of sensors is configured to measure a toggle rate of a respective one of the set of module instances; and the control circuit is configured to select a new one of the set of module instances in response to the toggle rate of the selected module instance being indicative of a temperature exceeding a threshold temperature.

20. The programmable IC of claim 17, wherein:

each of the plurality of sensors is an oscillator circuit configured to generate a clock signal having a frequency that correlates to a temperature of the respective one of the set of module instance; and the control circuit is configured to select a new one of the set of module instances in response to the sensor for selected module instance generating a clock signal having a frequency indicative of a temperature exceeding a threshold temperature.

* * * * *